UNITED STATES PATENT OFFICE.

JOHN COMMINS, OF CHARLESTON, SOUTH CAROLINA.

PROCESS OF TREATING SALT-MARSH GRASS.

SPECIFICATION forming part of Letters Patent No. 251,188, dated December 20, 1881.

Application filed September 16, 1881. (No specimens.)

*To all whom it may concern:*

Be it known that I, JOHN COMMINS, of Charleston, in the county of Charleston and State of South Carolina, have invented certain new and useful Improvements in the Process of Treating Salt-Marsh Grasses; and I do hereby declare the following to be a full, clear, and exact description of the invention, such as will enable others skilled in the art to which it pertains to make and use it.

My invention relates to an improved process of treating salt-marsh grass, (*Spartina glabra*,) so as to render it fit for food for animals when dried; and it consists in taking the grass while green, passing it through suitable crushing or breaking machines, so as to disintegrate the fiber, place the grass thus disintegrated in tanks of fresh water, for the purpose of extracting the salt, then drying the grass, and then mixing it with bran, meal, or any other suitable material which will add nutriment to the grass, all of which will be more fully described hereinafter.

The object of my invention is to take the black marsh-grass which grows along the coasts and treat it in such a way that it can be used as a substitute for hay in feeding stock of all kinds, and thus produce a new article of manufacture from what has been practically useless heretofore except in a green state.

The black marsh-grass which grows along the southern coasts is a valuable article of food for horses, cattle, and stock of all kinds when in a green state. Heretofore it has been found impossible to preserve this grass because it contains so much salt that when any attempt is made to preserve it in a dry state it molds and mildews during damp weather to such an extent as to make it worthless. Even if properly dried it contains so much salt that animals will not eat it. For these reasons this grass has only been available for food while in a green state, and even then it must not be eaten by milch cows, for the grass contains a gas which renders not only the milk but the flesh of cows very offensive to the taste. In order to render this grass fit for use in a dried state, I take it while green and pass it through any suitable crushing, breaking, or disintegrating machinery, so as to reduce it, and then I take the grass thus disintegrated and place it in vats containing fresh water. The grass being thus disintegrated, the water comes in contact with every part of it and absorbs not only about seven-eighths of the salt, but all the offensive gas above referred to. After the grass has remained in the water long enough to have the salt extracted from it to any desired degree the grass is taken out and dried in any suitable manner, either by being placed in the sun or by having currents of hot air passed through it. After the grass has become sufficiently dried it is passed through a revolving cylindrical mixing-machine, where it is mixed with about two hundred pounds of bran, or any suitable material, to every ton of grass. The bran adheres to the grass and makes it very sweet and nutritious for stock of all kinds.

By the above process I am enabled to produce a new article of food which can be used as a substitute for hay, and which is not only cheaper, but more nutritious.

Having thus described my invention, I claim—

The process herein described of treating salt-marsh grass, consisting in disintegrating the grass while green, placing the disintegrated grass in fresh water, drying the grass, and then mixing it with bran or any other suitable material, substantially as specified.

In testimony whereof I affix my signature in presence of two witnesses.

JOHN COMMINS.

Witnesses:
W. WALTER RILEY,
N. M. PORTER.